United States Patent
Merkel et al.

(10) Patent No.: US 6,516,491 B2
(45) Date of Patent: *Feb. 11, 2003

(54) WIPER BLADE FOR CLEANING WINDOWS OF MOTOR VEHICLES

(75) Inventors: Wilfried Merkel, Kappelrodeck (DE); Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/790,753

(22) Filed: Feb. 22, 2001

(65) Prior Publication Data

US 2001/0008034 A1 Jul. 19, 2001

Related U.S. Application Data

(63) Continuation of application No. 09/284,884, filed as application No. PCT/DE98/02074 on Jul. 23, 1998, now Pat. No. 6,295,690.

(30) Foreign Application Priority Data

Sep. 8, 1997 (DE) .......................... 197 39 256

(51) Int. Cl.[7] ............... B60S 1/38; B60S 1/40
(52) U.S. Cl. ............... 15/250.201; 15/250.43; 15/250.32
(58) Field of Search ............... 15/250.48, 250.201, 15/250.451, 250.43, 250.452, 250.44, 250.453, 250.32, 250.361

(56) References Cited

U.S. PATENT DOCUMENTS

| | | | | |
|---|---|---|---|---|
| 3,317,945 A | * | 5/1967 | Ludwig | 15/250.48 |
| 3,418,679 A | * | 12/1968 | Barth et al. | 15/250.48 |
| 6,279,191 B1 | * | 8/2001 | Kotlarski et al. | 15/250.201 |
| 6,295,690 B1 | * | 10/2001 | Merkel et al. | 15/250.201 |

FOREIGN PATENT DOCUMENTS

| | | | | |
|---|---|---|---|---|
| DE | 1028896 | * | 4/1958 | 15/250.43 |
| DE | 1505379 | * | 7/1969 | 15/250.002 |
| DE | 1247161 | * | 1/1970 | 15/250.43 |
| DE | 2458199 | * | 6/1975 | 15/250.451 |
| DE | 2839587 | * | 3/1980 | 15/250.43 |
| IT | 692226 | * | 7/1965 | 15/250.451 |

* cited by examiner

*Primary Examiner*—Gary K. Graham
(74) *Attorney, Agent, or Firm*—Michael J. Striker

(57) ABSTRACT

A wiper blade (10) is proposed that serves to clean windows of motor vehicles. The wiper blade has an elongated, rubber-elastic wiper strip (14) which is provided on its two long sides with respective facing longitudinal grooves (38, 40), in each of which one spring rail (30, 32), protruding intermittently from the grooves by one longitudinal edge (42, 44), is disposed; the spring rails belong to an elongated, spring-elastic support element (12) for the wiper strip (14), on whose middle portion a connection device (16) for a wiper arm (18) guided on the vehicle body is disposed. An especially simple disposition of a wind deflector strip and a connection device for a wiper arm are obtained if at least one longitudinal portion of the part of the wiper strip located on the side of the spring rails (30, 32) remote from the window is embodied as a wind deflector strip (54), and if furthermore the connection device (16) is retained on the longitudinal edges (42, 44) of the spring rails (30, 32) that protrude from the longitudinal grooves (38, 40).

5 Claims, 2 Drawing Sheets

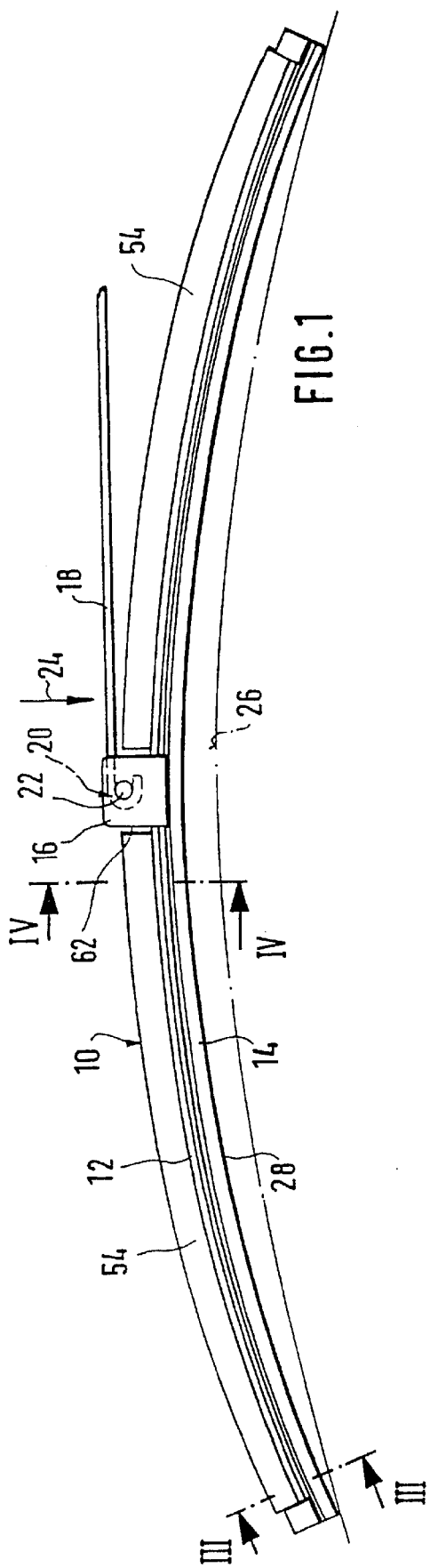
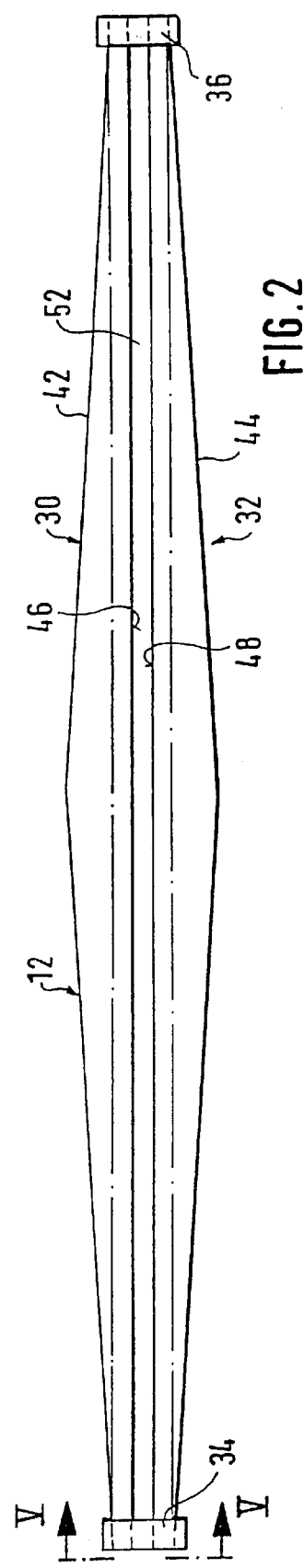

WIPER BLADE FOR CLEANING WINDOWS OF MOTOR VEHICLES

CROSS REFERENCE

This is a continuation of U.S. patent application Ser. No. 09/284,884 Apr. 22, 1999, now U.S. Pat. No. 6,295,690, filed under 35 U.S.C. 120, which is a 371 of PCT/DE98/02074, filed Jul. 23, 1998.

BACKGROUND OF THE INVENTION

Field of the Invention

The present invention relates to a wiper blade for cleaning windows of motor vehicles and, more particularly, to a wiper blade comprising an elongated, rubber-elastic wiper strip provided with respective longitudinal grooves on its corresponding long sides, a support element for the wiper strip with corresponding spring rails engaged in and protruding from the longitudinal grooves and a connecting device for a wiper arm connected to a middle portion of the support element.

In wiper blades of the prior art, the support element is meant to assure the evenest possible distribution of the wiper blade contact pressure on the window over the entire swept field swept by the wiper blade. By means of a suitable curvature of the unstressed support element—that is, when the wiper blade is not applied to the window—the ends of the wiper strip, which in wiper blade operation are pressed entirely against the window, are urged toward the window by the then stressed support element, even if the radii of curvature of the spherically curved vehicle window differs in every position of the wiper blade. The curvature of the wiper blade must accordingly be somewhat greater than the greatest curvature of the swept field of the window to be wiped. The support element thus replaces the complicated support bracket construction, having two spring rails disposed in the wiper strip, of the kind employed in conventional wiper blades (German Patent Disclosure DE-OS 15 05 379).

In a known wiper blade of this type (German Patent DE-PS 10 28 896), with an attendant buildup of overpressure, the wiper blade can be engaged from below, on the front side facing into the wind, by this overpressure. On the other hand, on the backside facing away from the wind, a considerable negative pressure builds up. Although the wiper blade, which during operation usually executes a pendulum motion, constantly changes its position relative to the oncoming relative wind, even then one of its long sides is always more or less greatly exposed to the wind and is therefore called the front side, while its other long side is accordingly also thought of as the back side. At relatively high vehicle speeds, given the cooperation of these two aforementioned pressures, both of which are oriented counter to the wiper blade contact pressure, this contact pressure is reduced at least enough that proper wiping is no longer possible. Increasing the wiper blade contact pressure against the window at high vehicle speeds could admittedly reduce the severity of this problem, but at lower vehicle speeds, when the liftoff tendency is less, the friction between the wiper blade and the window increases; this leads to undesirable noise buildup and to excessively high stress on the drive components and on the rubber of the wiper. To suppress the aforementioned tendencies of the wiper blade to lift off from the window, the accessories trade offers so-called spoilers, which can be disposed on the wiper blade and support bracket system. With the wiper blade in question, however, this cannot be done, because fastening what is as a rule a rigid spoiler to the support element would render the flexibility of the support element virtually nil, making proper cleaning of the prescribed swept field no longer possible.

SUMMARY OF THE INVENTION

It is an object of the present invention to provide an improved wiper blade that does not have the above-described disadvantages.

According to the invention the wiper blade comprises an elongated, rubber-elastic wiper strip provided with respective longitudinal grooves on corresponding opposite long sides thereof and with a wiper lip for contact with a window; an elongated spring-elastic support element having spring rails engaged in and protruding from the longitudinal grooves provided in the wiper strip; a connection device for a wiper arm connected to a middle portion of the support element, wherein the spring rails have respective longitudinal edges extending outside of the longitudinal grooves and the connection device fits on the respective longitudinal edges to retain and hold the spring rails in the longitudinal grooves; a wind deflector strip comprising at least one longitudinal portion of the wiper strip located on a side of the spring rails opposite from the wiper lip and retaining means engaging opposite end portions of the spring rail.

In the wiper blade, via the leading-edge face of the wind deflector strip that faces into the wind, a force component aimed at the window is built up, which counteracts the liftoff tendency of the two pressures and thus assures excellent cleaning quality, at least in the region of the swept field swept by the wiper blade, that is, the region that is important to the vehicle's driver. Depending on the size of the leading-edge face, this "auxiliary contact pressure" can be adapted to the variable demands that depend for instance on the type of vehicle. It is also advantageous in the arrangement of the invention that as a function of the vehicle speed, the contact pressure rises or falls with this speed. Thus a suitably high "auxiliary contact pressure" is opposed only to the liftoff tendency that occurs at high speed. At the same time, the longitudinal edges of the spring rails that protrude from the longitudinal grooves of the wiper strip offer an excellent capability of positioning and fastening the connection device.

If along its length the wind deflector strip has at least one recess, extending nearly to the longitudinal grooves, which serves to receive retaining means, disposed crosswise to the length, for the two spring rails, then the retaining means can become operative near their retention/attachment points, thus making undesirable leverage effects avoidable.

The part of the wiper strip embodied as a wind deflector strip expediently has a substantially triangular cross section, whose side facing into the wind is scooped out in concave fashion; the second side of the wind deflector strip is oriented essentially perpendicular to the window, and the third side, to form a wind deflector strip of compact design, forms the one groove wall, facing away from the window, for the spring rails.

Advantages from a manufacturing standpoint can be obtained if the wiper strip has a constant cross section substantially over its entire length.

To stabilize the wiper blade, the spring rails that belong to the support element can be engaged by a plurality of retaining means distributed over the length of the spring rails.

In this respect, further advantages from the standpoint of mounting and assembly are obtained if the connection device is embodied as retaining means.

An especially simple form of the further retaining means is obtained if these retaining means are embodied as clamps, which with claws on their ends reach around the spring rails on the longitudinal edges facing away from one another.

On the two ends of the wiper blade, mounting the retaining means becomes easy if the spring rails have their end portions exposed, and also if clamplike retaining means engage these end portions.

Further advantageous refinements and features of the invention are recited in the ensuing description of an exemplary embodiment shown in the accompanying drawing.

BRIEF DESCRIPTION OF THE DRAWING

The objects, features and advantages of the invention will now be illustrated in more detail with the aid of the following description of the preferred embodiments, with reference to the accompanying figures in which:

FIG. 1 shows a side view of a wiper blade of the invention;

FIG. 2 shows a plan view, not to scale, on a support element belonging to the wiper blade and in which support element a wind deflector strip of the wiper blade is shown by dot-dash lines;

DESCRIPTION OF THE EXEMPLARY EMBODIMENT

Figure 3:
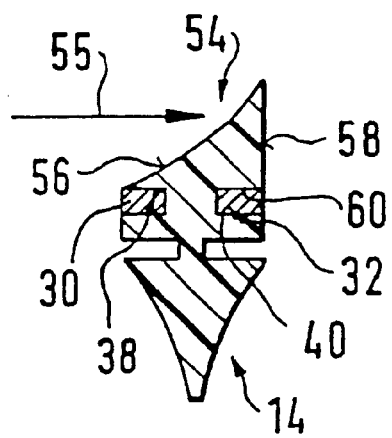
FIG. 3 shows a section through the wiper blade, taken along the line III—III in FIG. 1, on a larger scale.

A wiper blade 10 shown in FIG. 1 has a multi-part, elongated, spring-elastic support element 12 (FIG. 2), to whose underside an elongated, rubber-elastic wiper strip 14 is secured longitudinally axially parallel to it. A connection device 16 is disposed on the top side of the support element, and with its aid the wiper blade 10 can be detachably connected to a driven wiper arm 18. A hook acting as a counterpart connection means is formed onto the free end 20 of the wiper arm 18 and grasps a pivot pin 22 that belongs to the connection device 16 of the wiper blade. The connection of the wiper arm 18 to the wiper blade 10 is made with securing means not shown in further detail but known per se and embodied as adapters. The wiper arm 18 and thus also the hook on the end 20 of the arm is urged in the direction of the arrow 24 toward the window to be wiped, whose surface to be wiped is suggested in FIG. 1 by a dot-dash line 26. Since the dot-dash line 26 is meant to represent the greatest curvature of the window surfaces, it is quite apparent that the curvature of the wiper blade, which rests with its two ends on the window, is greater than the maximum curvature of the window. Under the contact pressure (arrow 24), the wiper blade presses with its wiper lip 28 over its entire length against the window surface 26. This causes tension to build up in the bandlike, spring-elastic support element 12, and this tension assures a proper contact of the wiper strip 14 or wiper lip 28, over their entire length, with the motor vehicle window.

It can be seen from FIG. 2 that the support element 12, seen there in plan view, comprises a plurality of individual parts. For instance, it has two spring rails 30 and 32, which in the exemplary embodiment are joined together by clamplike or clawlike retaining means 34 and 36 placed on both ends of the spring rails located adjacent one another. As FIGS. 3 and 4 particularly show, each of the two spring rails 30 and 32 is located in a respective longitudinal groove 38 and 40 assigned to it in the wiper strip 14; the grooves are disposed in the same plane and are thus opposite one another. FIG. 2 also shows that both spring rails 30 and 32 are wider in their middle region than in their end regions, because the two outer longitudinal edges 42, 44, facing away from one another, extend accordingly. The two inner longitudinal edges 46, 48 facing toward one another are oriented parallel to one another, however. These inner longitudinal edges 46 and 49 rest on the bottom of the both respective longitudinal grooves 38 and 40. Since in the exemplary embodiment the depth of the grooves is approximately equal to the width of the spring rails 30 and 32 in their end regions, toward the middle portion the two spring rails protrude increasingly far out of the longitudinal grooves 38 and 40 with their outer longitudinal edges 42 and 42 (see FIGS. 2, 3, and 4).

Figure 4:
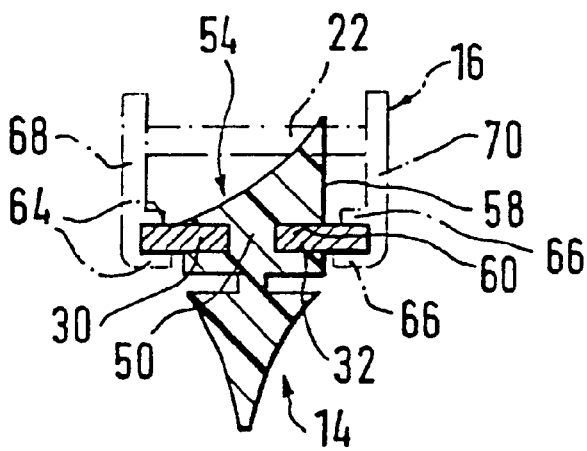
FIG. 4 shows an enlarged wiping area of the wiper blade along the line IV—IV in FIG. 1, with the connection device for the wiper arm shown in dot-dash lines.

FIGS. 3 and 4 also show that the wiper strip 14 extends with a constriction 50, dictated by the longitudinal grooves 38 and 40, through the slot 52 (FIG. 2) that remains between the two inner longitudinal edges 46 and 48, and after that the wiper strip widens again on the side of the support element 12 facing away from the window and is provided with a substantially triangular cross section, which serves as a wind deflector strip. The one side face 56 of the wind deflector strip facing predominantly into the wind (arrow 55 in FIG. 2) is scooped out in concave fashion. The second side face 58 of the wind deflector strip is oriented essentially perpendicular to the window 26, and the third side face 60 of the wind deflector strip forms the wall, pointing away from the window, of the two longitudinal grooves 38 and 40. As can be seen from the dot-dash line in FIG. 2, the wiper strip 14 and the wind deflector strip 54 integrated with it have a constant 1 cross section, in this exemplary embodiment. Nevertheless, if is also conceivable for at least the cross section of the wind deflector strip 54 to be varied over its length. The constant cross section over the length of the wind deflector strip 54 in the exemplary embodiment does not, however, preclude its being interrupted—as can be seen in FIG. 1—in the middle region of the wiper blade 10 by a recess 62, which extends nearly to the support element 12. The connection device 16 for the wiper arm 18 is disposed in this recess 62. With pairs of legs 64 and 66, the connection device 16 fits over and under the spring rails 30 and 32 and keeps them in their prescribed position in the longitudinal grooves 38 and 40. The legs 64 and 66 are located on cheeks 68 and 70 of the connection device 16, which are joined together by the pivot pins 22 already mentioned. The connection device 16 thus forms a retaining means for the two spring rails 30 and 32.

Figure 5:
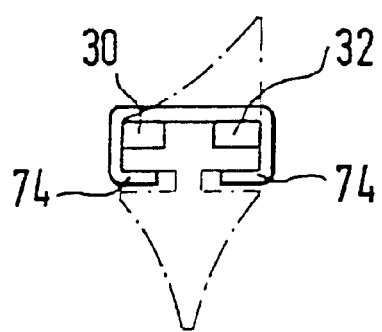
FIG. 5 shows an enlarged view of the support element in the direction of the arrow V, rotated by 90°.

However, so that the spring rails 30 and 32 will remain with their end regions properly within the longitudinal grooves 38 and 40, further retaining means embodied as clamps 72 are provided, which with claws 74 on their ends (see FIG. 5) reach around the spring rails at their longitudinal edges 42 and 44 facing away from one another. FIGS. 1 and 2 show that the spring rails 30 and 32 emerge with their end portions from the longitudinal grooves 38 and 40, because the wind deflector strip is slightly shorter than the support element 12, and thus the clamps 74 can engage the end portions of the support element. If the wiper blades are long enough, then it may be expedient to dispose additional clawlike retaining means along the length of the wiper blade; in that case, a recess must then be assigned to them, to allow these clamps to pass through the wind deflector strip 54.

It is clear from the above that besides the two spring rails 30 and 32, the support element 12 also includes retaining means, which assure the securing of the support element to the wiper strip 14. The connection device 16, however, is intended primarily to make a pivotable connection possible between the wiper arm 18 and the wiper blade 10. The connection device 16 furthermore has an additional function, as already described, namely to secure the spring rails 30 and 32 in their middle region.

In view of the various tasks to be taken on by the wiper lip 28 or the wind deflector strip 54, the wiper strip can be made for instance with the aid of what is known as multi-component extrusion.

Instead of the separate retaining means 34 and 36 at the ends of the spring rails 30 and 32, it is also conceivable to embody these retaining means as transverse legs, joined integrally to one or both spring rails and extending to the other spring rail; their free ends, bend into claws, then reach around this other spring rail. Other forms of fastening, however, are also possible—such as adhesive bonding, welding, and so forth.

What is claimed is:

1. A wiper blade for cleaning windows of motor vehicles, said wiper blade comprising an elongated, rubber-elastic wiper strip (14) provided with respective longitudinal grooves (38, 40) on corresponding opposite long sides thereof and with a wiper lip (28) for contact with a window (26);

an elongated spring-elastic support element (12) for the wiper strip (14), said support element (12) having corresponding spring rails (30, 32) engaged in and protruding from the longitudinal grooves (38, 40) provided in the wiper strip (14);

a connection device (16) having means for coupling with a wiper arm (18) connected to a middle portion of the support element (12), wherein said spring rails (30, 32) have respective longitudinal edges (42, 44) extending outside of the longitudinal grooves (38, 40) and said connection device (16) fits on the respective longitudinal edges (42, 44) of the spring rails (30, 32) to retain and hold the spring rails (30, 32) in the longitudinal grooves (38, 40);

a wind deflector strip (54) comprising at least one longitudinal portion of the wiper strip, said at least one longitudinal portion being located on a side of the spring rails (30, 32) remote from the wiper lip (28); and respective retaining means (34, 36) comprising clamps (74), said respective retaining means (34, 36) engaging corresponding opposite end portions of said spring rails (32) and being separate distinct components from said connection device (16).

2. The wiper blade as defined in claim 1, wherein said wind deflector strip (54) has a first side (56) facing predominatly in a wind direction (55), said first side (56) including a concave surface for wind deflection.

3. The wiper blade as defined in claim 2, wherein said wind deflector strip (54) has a second side (58) on a side of said wind deflector strip (54) opposite from said first side (56) and said wind deflector strip (54) has a substantially triangular transverse cross-section.

4. The wiper blade as defined in claim 2, wherein said wind deflector strip (54) is provided with at least one recess (62) for receiving said retaining means, said at least one recess (62) extending longitudinally along said wind deflector strip (54) nearly to the longitudinal grooves (38,40), and said retaining means (34,36) extend across said deflector strip (54).

5. The wiper blade as defined in claim 4, wherein said clamps (74) comprise claws reaching around the longitudinal edges (42,44) of the spring rails (32) to hold the end portions of the spring rails (32).

* * * * *